United States Patent [19]
Kurtz et al.

[11] 3,976,176
[45] Aug. 24, 1976

[54] SPIRAL CHUTE DEVICE

[76] Inventors: John C. Kurtz; Thomas E. Kurtz; George D. Kurtz, all of R.R. 1, New Haven, Ind. 46774

[22] Filed: May 22, 1975

[21] Appl. No.: 579,873

[52] U.S. Cl. .................................. 193/12; 193/17
[51] Int. Cl.² ........................................ B65G 11/06
[58] Field of Search ................ 193/2 A, 3, 12, 13, 193/15, 17–21, 30, 32, 34; 214/14, 15 R, 15 E, 17 R, 17 C, 17 CB; 302/60, 61

[56] References Cited
UNITED STATES PATENTS

| 380,707 | 4/1888 | Warner | 193/12 |
|---|---|---|---|
| 403,742 | 5/1889 | Dodge | 193/12 X |
| 1,050,272 | 1/1913 | Hamilton | 193/12 X |
| 1,270,366 | 6/1918 | Bend | 193/12 |
| 1,754,375 | 4/1930 | Sturges | 193/12 |
| 1,766,681 | 6/1930 | Payne | 193/3 X |
| 1,784,272 | 12/1930 | Constable | 193/12 |
| 1,968,071 | 7/1934 | Craine | 193/30 X |

Primary Examiner—Evon C. Blunk
Assistant Examiner—James L. Rowland
Attorney, Agent, or Firm—Albert L. Jeffers; Roger M. Rickert

[57] ABSTRACT

A spiral chute device, especially for use in conveying seed materials to storage chambers. The spiral chute device is employed for guiding the seed material downwardly in the storage chamber to prevent the seed material from undergoing free fall which could lead to cracking thereof. The device is, preferably, suspended from the top wall of the chamber and has a hopper at the top with an upwardly opening spiral chute extending downwardly therefrom to near the bottom of the chamber. The device includes a center post telescopically engaged by a guide member at the center of the bottom wall of the chamber and the device can be moved laterally in the chamber by disengaging the lower end of the post from the guide member. When the device is disengaged from the guide member and swung laterally in the chamber, the bottom of the chamber is exposed and seed material therein can then be swept into a discharge channel formed in the bottom wall of the chamber whereby substantially all the seed material can be removed from the chamber.

8 Claims, 6 Drawing Figures

SPIRAL CHUTE DEVICE

The present invention relates to a spiral chute device, and particularly to a spiral chute device for use in a seed material storage chamber for preventing damage to the seed material when it is introduced into the chamber.

A great many seed materials, such as soy beans and other like materials, are characterized in having a hard outer shell which, if cracked, will damage the seed and inhibit the germination of the seed after it is stored. Such seed material is stored in large quantities and, usually, in a vertically elongated silo-like chamber wherein it is maintained in proper conditions for use at a future date.

It has been the case that the filling of such chambers with seed material has resulted in considerable damage to the seed material by cracking of the outer shell thereof due to the distance that the seed material undergoes free fall in the storage chamber when it is supplied thereto. Seed material having any substantial number of damaged seeds therein is, of course, considerably reduced in value and causes problems when the seed is planted.

With the foregoing in mind, a primary objective of the present invention is the provision of a spiral chute device which can be employed in seed material storage chambers to prevent the seed material conveyed to the storage chamber from undergoing more than a predetermined amount of free fall when the seed material is supplied to the chamber.

Another object is the provision of a device for use in preventing damage to seed material when it is supplied to a storage chamber which is relatively inexpensive to build and convenient to use and to install in the chamber.

A still further object is the provision of a spiral chute device of the nature referred to which can be moved in the chamber to expose the bottom wall of the chamber to facilitate removal of all seed material therefrom when it is desired to empty the chamber.

Another object of the invention is the provision of a spiral chute which is substantially self cleaning in that the seed grain will all substantially travel through the chute as it is being unloaded into the storage chamber.

A further object of the invention is to provide a spiral chute which is suspended above the floor of the storage chamber so that the floor of the chamber can be easily swept underneath the spiral chute to substantially remove all of the seed grain.

BRIEF SUMMARY OF THE INVENTION

According to the present invention, a spiral chute device is provided with a hopper having a bottom opening and connecting the upper end of an elongated spiral chute to the bottom opening of the hopper. A center post having its upper end disposed in the hopper extends down the center of the spiral chute and forms the inner side wall of the chute. The chute proper consists of a bottom wall which has the inner edge connected to the center post as by welding and an upstanding outer wall which may be integral with the bottom wall.

The spiral chute device may be formed in axial sections that can be interconnected in end-to-end relation and thereby adapt the spiral chute device to chambers of various heights. The lower end of the spiral chute device is positioned relative to the bottom wall of the chamber so that seed material running out the lower end of the spiral chute device does not undergo more than a predetermined small amount of free fall with the amount of free fall selected such that the hard outer shell of the seed material will not become cracked or damaged when it comes to rest in the storage chamber. The chute opens upwardly and, accordingly, the entire chamber can be filled by a continued supply of seed material to the hopper.

The device is advantageously suspended from the top wall of the chamber while, at the bottom, a guide member upstanding from the bottom wall of the chamber telescopically engages the lower end of the center post of the device and prevents the device from swinging in the chamber when in use.

However, when it is desired to empty the chamber by withdrawing seed material from the bottom thereof, when the chamber approaches an empty condition, the post can be disengaged from the guide member and the device swung laterally in the chamber thereby exposing the bottom wall of the chamber so seed material thereon can be swept into position to be discharged or removed from the chamber.

The exact nature of the present invention will become more clearly apparent upon reference to the following detailed description taken in connection with the accompanying drawings in which.

DETAILED DESCRIPTION OF THE INVENTION

Figure 1:
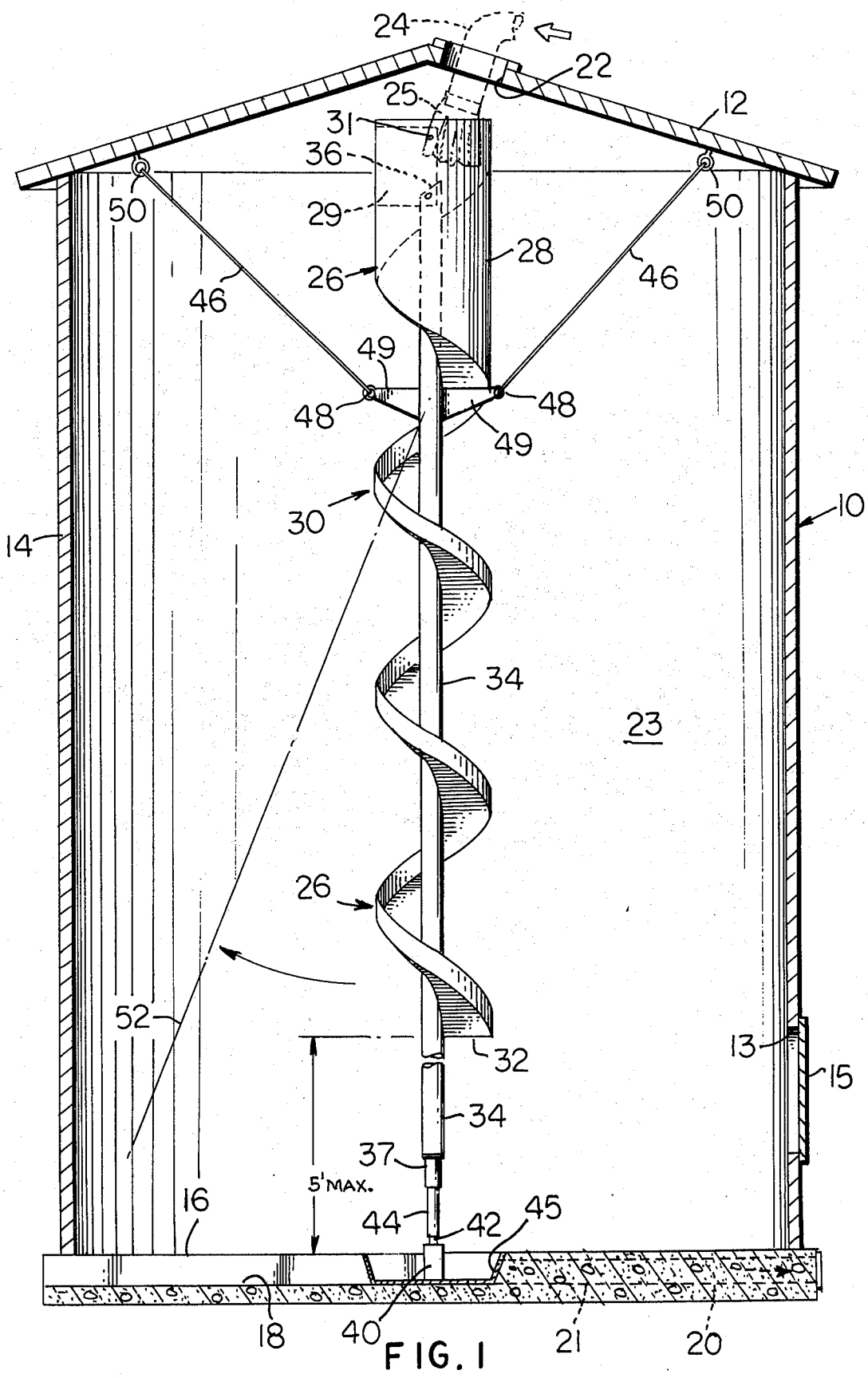
FIG. 1 is a vertical section through a typical seed material storage chamber having a spiral chute device according to the present invention mounted therein.

Referring to the drawings somewhat more in detail, reference numeral 10 generally indicates a typical storage bin of the nature with which the present invention is adapted to be used. The storage chamber comprises top wall means 12, upstanding side wall means 14 having an opening 13 with a cover 15 and bottom wall means 16. Bottom wall means 16 may, for example, be in the form of a concrete slab and has formed therein one channel 18 for admitting air to the interior of the chamber and another channel means 20 which is employed for a discharge channel and which may have an auger 21 therein or adapted to be introduced therein to withdraw seed material from the chamber 23. Each of the channel means 18 and 20 may extend substantially radially toward the center of the bottom wall means of the chamber.

The top wall means 12 is provided with a filling opening 22 adapted for receiving a conduit 24 having a flexible deflector 25 surrounding the opening to retard the speed or flow of the seed as it is supplied to chamber 23 for storage therein.

According to the present invention, the storage chamber 23 is provided with a spiral chute device generally indicated at 26 and which is operable for preventing any damaging amount of free fall of the seed material supplied to the chamber 23. Spiral chute device 26 has a tubular hopper 28 at the upper end opening upwardly and into which seed material from conduit 24 flows. A flexible deflector 29 is mounted within the hopper 28 by rivets 31. The deflector 29 serves to prevent damage to the grain as it flows from the conduit 24 into the hopper 28.

Hopper 28 has a bottom opening and extending downwardly from the bottom opening is a spiral chute arrangement 30. Seed material or the like supplied by conduit 24 to hopper 28 will, thus, be discharged from hopper 28 into the upper end of chute 30 and flow down chute 30 to the lower end 32 thereof and from this point will drop to the bottom wall of the chamber.

Figure 2:
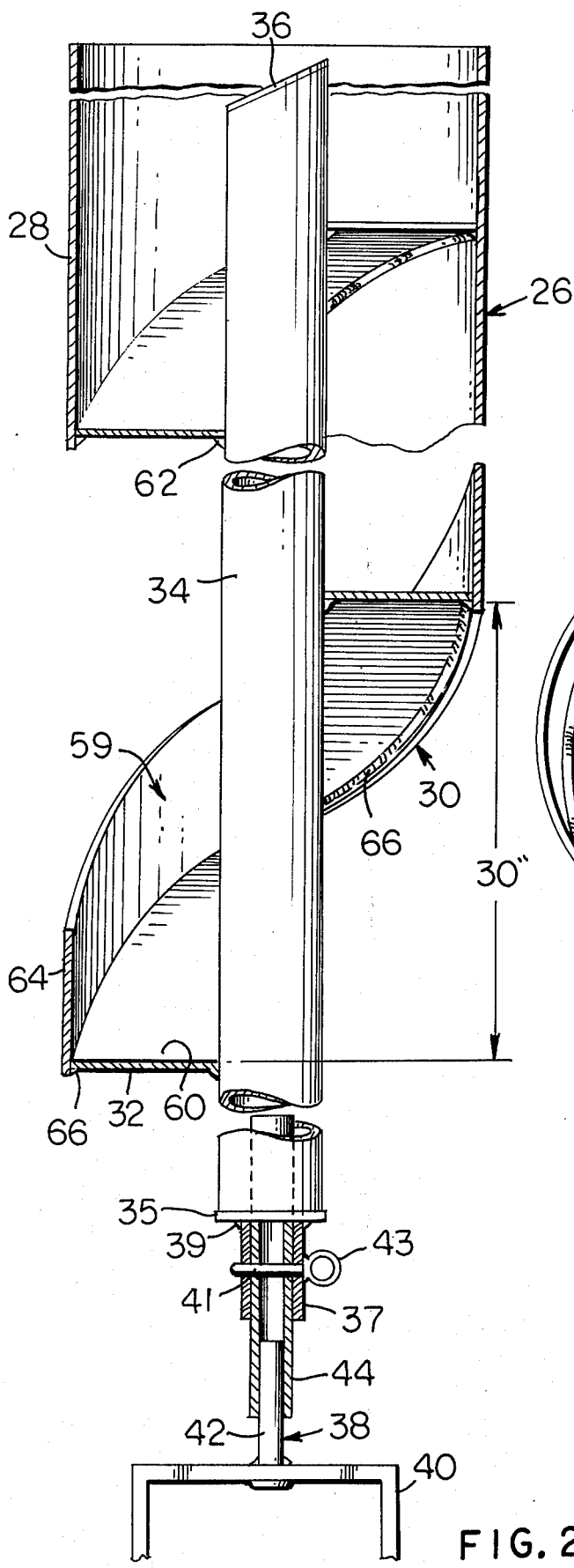
FIG. 2 is a fragmentary vertical section drawn at enlarged scale showing details of the spiral chute device.
Figure 3:
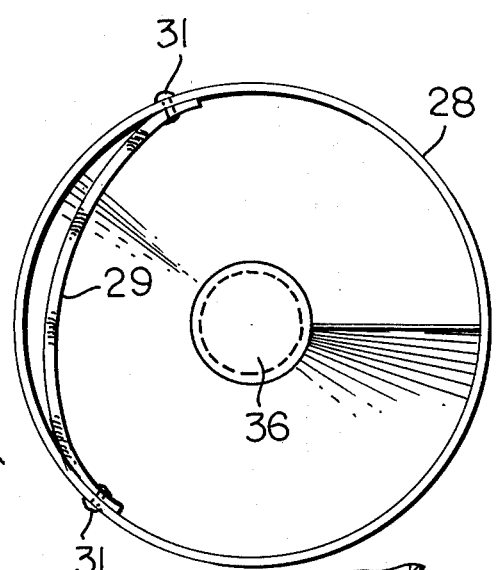
FIG. 3 is a plan view looking down on top of the hopper of the spiral chute device and drawn at the same scale as FIG. 2.
Figure 4:
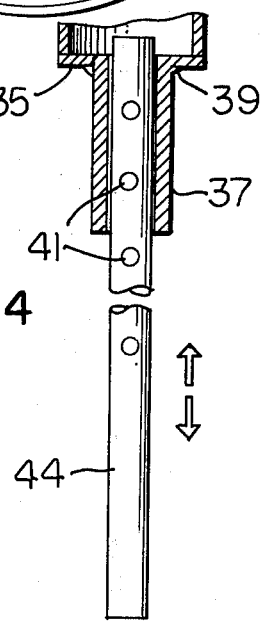
FIG. 4 is a fragmentary vertical section of the adjustable mounting post.

The spiral chute device includes a tubular center post 34 which may be, for example, about 4 inches in diameter and which extends upwardly into the hopper 28 and wherein the upper end of the post is closed by a cap 36 as will best be seen in FIG. 2.

The lower end of post 34 is provided with a support plate 35 having an opening therein for receiving a bushing 37 and welded thereto at 39. A guide member 38 is mounted on the bottom wall 16 of chamber 23 in about the center thereof. As will be seen in FIG. 2, guide member 38 comprises a support bracket 40 which may be rigidly connected, as by welding, to a pan-like element 45 in bottom wall 16 while upstanding from the bracket element 40 is a stud 42 which may be welded or secured to the bracket element 40.

The stud 42 is adapted to receive an adjustable sleeve 44 that telescopically engages the bushing 37. The bushing 37 is provided with an opening 41 which is adapted to correspond to vertical spaced openings 41 in the sleeve 44 to receive a pin 43. It will be noted in FIG. 2 that the guide or locating member arrangement at the bottom of post 34 provides no support for the post but is provided merely for laterally stabilization of the lower end of the post. If desired, the adjustable sleeve can be lowered by removing the pin 43 until it engages the bracket 40 and the pin reinserted in one of the spaced openings 41 in a manner to support the post 34.

Normally support for the spiral chute device is provided by chain or cable means 46 which are connected at 48 to the spiral chute device near the bottom of hopper 28 and extend upwardly and outwardly to connector members 50 provided on the underside of upper wall 12 of the chamber 23. The described supporting arrangement supports the spiral chute device within the chamber while permitting the chute device to be elevated to disengage the lower end of post 34 from guide member 38 whereupon the spiral chute device can be swung laterally, for example, to the dot-dash line position indicated at 52 in FIG. 1. If desired the guide and locating member can be a load supporting bearing by adjusting the sleeve 44 into engagement with the bracket 40.

When the spiral chute device is swung to a lateral position, a broom or sweeping device (not shown) can be engaged with guide member 38 and can then be employed for sweeping seed material on bottom wall 16 into channel 20 for discharge from the chamber whereby the chamber can be readily completely emptied.

The portion of post 34 and upwardly opening spiral chute 30 extending downwardly from hopper 24 can readily be formed in axial sections with sections being interconnected in end-to-end relation to construct an elongated spiral chute device for use in chambers of greater height.

In practice, it has been found that for most seed materials the lower end 32 of the chute can be up to five feet above the bottom wall 16 of the chamber without the seed material being damaged by dropping downwardly to the floor of the chamber. The pitch of the upwardly opening chute or channel portion 30 can be about 30 inches between adjacent flights thereof and this provides for a speed of movement downwardly of the seed material which provides for rapid filling of the chamber but prevents the seed material from having excessive velocity when it is discharged from the lower end 32 of the spiral chute device. It has also been found that a pitch of about 30 inches will make the chute 30 self cleaning with respect to the grain flowing down the chute. This is important with respect to seed material in that seed of different varieties should not be mixed at any time.

The upwardly opening channel portion 59 of the spiral chute device can be constructed as shown in FIG. 2. in which the channel is formed by a bottom wall 60 in the form of a spiral sheet which has an inner edge welded to post 34 as at 62 and either has the outer edge turned up, or has a vertical strip 64 at the outer edge welded at 66 to bottom wall 60 of the channel. The welds 62 and 66, in particular, the welding at 66, are on the underside of bottom wall 60 so that the weld will not abrade seeds sliding down the channel or chute.

The channel 59 formed by post 34, between wall 60 and upstanding outer wall 64, can be as wide as desired, depending on the rate at which seed material is to be supplied to the chamber. Due to the inclination of the spiral channel, widening thereof does not cause any increase in speed of movement of the seed material as it moves down the spiral channel.

The hopper 28 can advantageously be a simple cylindrical member of the proper size to receive the upper end of the spiral channel 59 and by welding the spiral channel to the inside of the hopper member, a hopper member is provided which is open at the top and which has a bottom opening directly communicating with the upper end of the spiral channel.

It will be appreciated that as the chamber 10 fills with seed material and the lower end of the spiral chute device is covered with seed material, the seed material can flow out the upwardly opening channel 59 into the chamber 23 and will undergo even less free fall than when the filling of the chamber is initiated.

In respect of chains or cables 46, the connections 50 on the top wall 12 of chamber 23 may be in the form of screw eyes or eye bolts while, at the other end of chains or cables 46, the connections at 48 may consist of eyes or the like attached to a pair of triangular support plates 49 welded to opposite sides of center post 34.

Figures 5, 6:
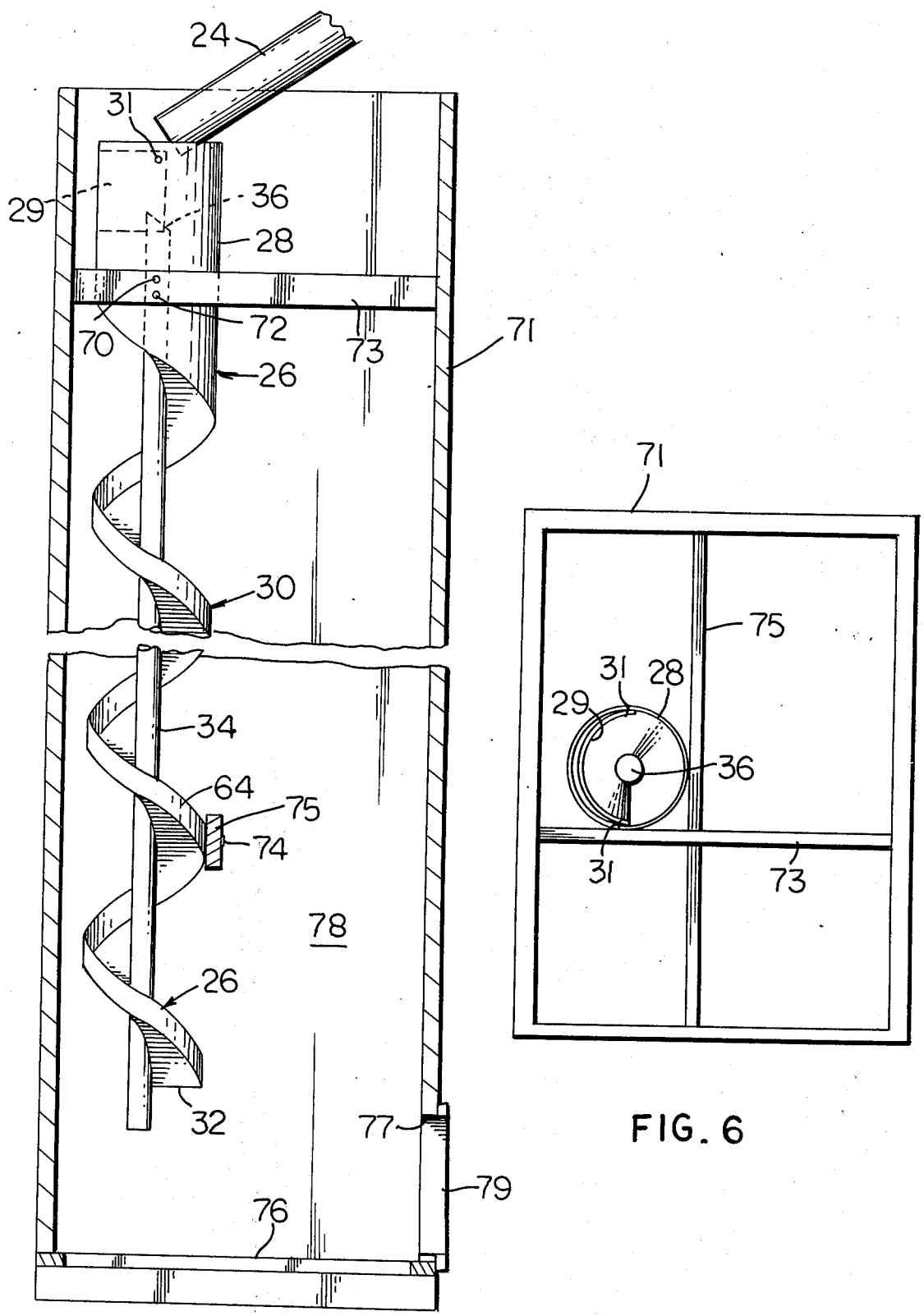
FIG. 5 is a vertical section through a modification illustrating a rectangular seed storage having a spiral chute device according to the present invention mounted therein.
FIG. 6 is a plan view looking down on top of the hopper of the spiral chute device of FIG. 5.

FIGS. 5 and 6 illustrate a rigid mounting system for mounting the spiral chute device in a rectangular building which may be constructed of wood or other material. As shown in FIG. 5 the rectangular bin 71 may be constructed within a building and is provided with an opening 77 for removing seed grain, and is provided with a cover 79. A cross support 73 is mounted within the upper portion of the bin 71, and the lower cross support 75 is mounted in the lower portion of the bin.

A stabilizing member 68 is mounted adjacent the hopper 28 and at approximately 90° with respect to the cross member 73. The hopper 28 is rigidly connected to the cross member 73 by bolts 70 and 72. The outer wall 64 of the spiral chute is bolted to the cross member 75 by a bolt 74. It should be noted that the spiral chute device 26 is rigidly mounted within the chamber portion 78 of the bin 71 with its lower portions 32 mounted approximately 5 feet above the floor 76. In operation the seed material flows from the conduit 24 into the hopper 28 being deflected in the hopper by the flexible member 29 to the spiral chute device 26. As the grain fills the chamber 78 it will flow over the outer wall 64 in the same manner as previously described with the embodiment illustrated in FIG. 1. It is to be understood that the rigid mounting device can be utilized with previously constructed bins both indoors and outdoors. The spiral chute device as above described, permits an operator to fill a bin without damaging the grain material and permits the operator to use the bin for different types of seed material in that the spiral chute device is self cleaning and is spaced sufficiently above the floor to permit the operator to remove all of the seed material from the bin prior to a subsequent use. The spiral chute device 26 is preferably constructed with a rate of pitch to diameter of 2 to 1, for example, if the spiral chute has a diameter of 16 inches the pitch will be 32 inches. The pitch may vary depending upon the type of grain being stored or the speed of fall desired for the grain. It has been found that a range of 16 to 64 inches pitch will provide an operable chute having a diameter of 16 inches.

Modifications may be made within the scope of the appended claims.

What is claimed is:

1. A spiral chute device for use in supplying seed material and the like without damage to a storage chamber having top and bottom wall means and side wall means; said chute device comprising a hopper disposed near the top wall means for receiving material to be stored in the chamber and having a bottom opening, and an upwardly opening spiral chute leading from said bottom opening in the hopper downwardly to above and near the bottom wall means of the chamber, said chute preventing the material from undergoing more than a predetermined amount of free fall from said spiral chute when supplied to the chamber, support means for swingably connecting said hopper to the top wall means of the chamber, a center post to which said chute is connected, and the lower end of said post being formed for adjustably engaging guide means on the bottom wall means of the chamber whereby disengagement of said center post from the guide means will permit swinging of said post and the chute connected thereto laterally in the chamber.

2. A spiral chute device for use in supplying seed material and the like without damage to a storage chamber having top and bottom wall means and the side wall means; said chute device comprising a hopper disposed near the top wall means for receiving material to be stored in the chamber and having a bottom opening, and an upwardly opening spiral chute leading from said bottom opening in the hopper downwardly to above and near the bottom wall means of the chamber, said chute preventing the material from undergoing more than a predetermined amount of free fall from said spiral chute when supplied to the chamber, a center post to which said chute is connected, and flexible support means for swingably connecting said chute device to the top wall means of the chamber to permit swinging of said post and the chute connected thereto laterally in the chamber.

3. A spiral chute device according to claim 2 wherein said spiral chute includes a spiral wrapping of a strip of material connected to said center post and bounded by an upstanding wall which is generally perpendicular to the spirally wrapped strip.

4. A spiral chute device according to claim 2 in which the center post includes an adjustable sleeve telescopically received within said center post, said adjustable sleeve adapted to engage a fixed member located on the bottom wall means to provide lateral stabilization of the lower end of the center post.

5. A spiral chute device according to claim 2 in which said chute in cross section has a horizontal bottom wall and an outer side wall upstanding from the bottom wall, said center post forming the inner wall of the chute.

6. A spiral chute device according to claim 5 in which said bottom wall of the chute is welded to said center post on the side of the bottom wall of the chute facing downwardly away from the chamber.

7. A spiral chute device according to claim 5 in which said side wall is a vertical strip welded to said bottom wall on the side of the bottom wall facing downwardly away from the center.

8. A spiral chute device according to claim 2 in which said flexible support means provide the entire support for said device in the chamber and guide means being arranged for telescopic engagement with the lower end of said center post while the post can be disengaged from the guide means by vertical movement of the post to permit the device to be moved laterally in the chamber.

* * * * *

UNITED STATES PATENT AND TRADEMARK OFFICE
CERTIFICATE OF CORRECTION

PATENT NO. : 3,976,176
DATED : August 24, 1976
INVENTOR(S) : John C. Kurtz; Thomas E. Kurtz; George D. Kurtz It is certified that error appears in the above-identified patent and that said Letters Patent are hereby corrected as shown below:

Col. 6, line 40, (Claim 6, "chamber" should be --- chute ---.

Signed and Sealed this

Seventh Day of December 1976

[SEAL]

Attest:

RUTH C. MASON
Attesting Officer

C. MARSHALL DANN
Commissioner of Patents and Trademarks